United States Patent Office 2,788,311
Patented Apr. 9, 1957

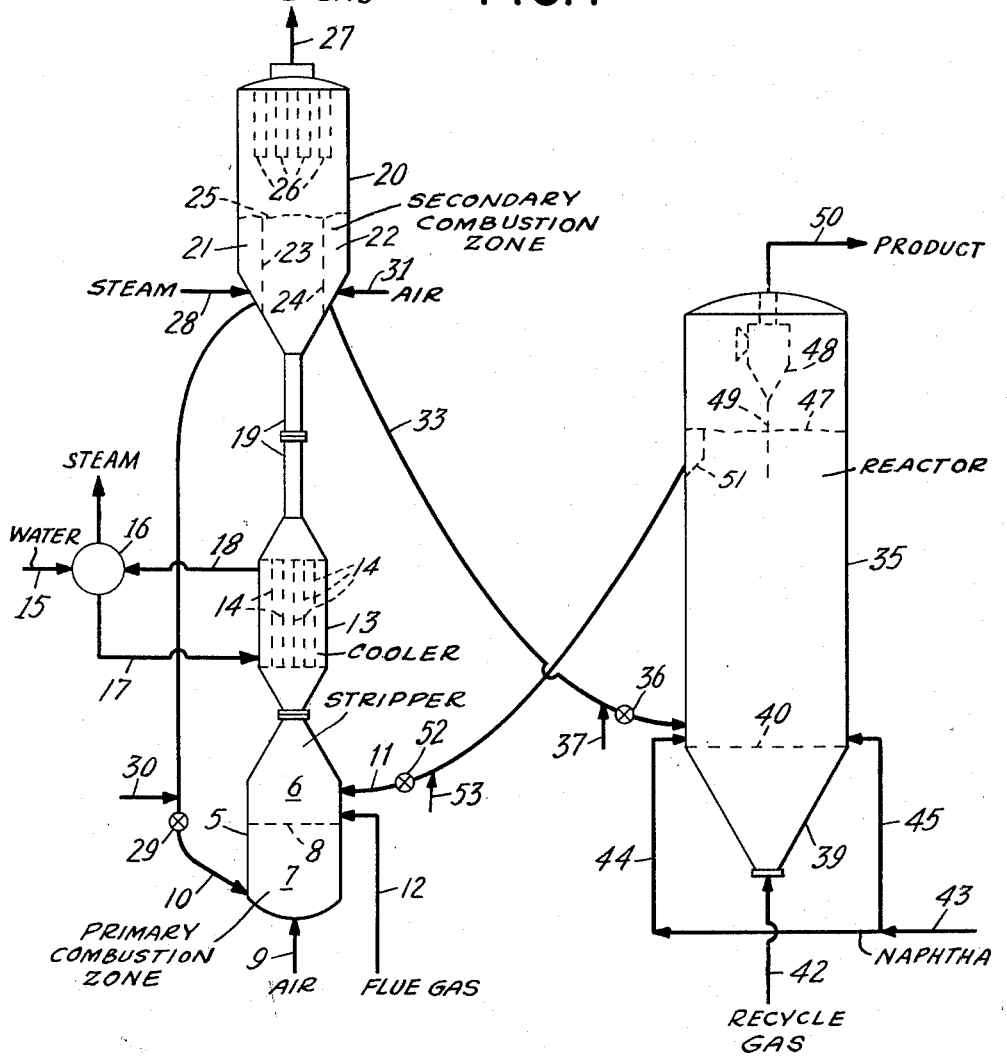

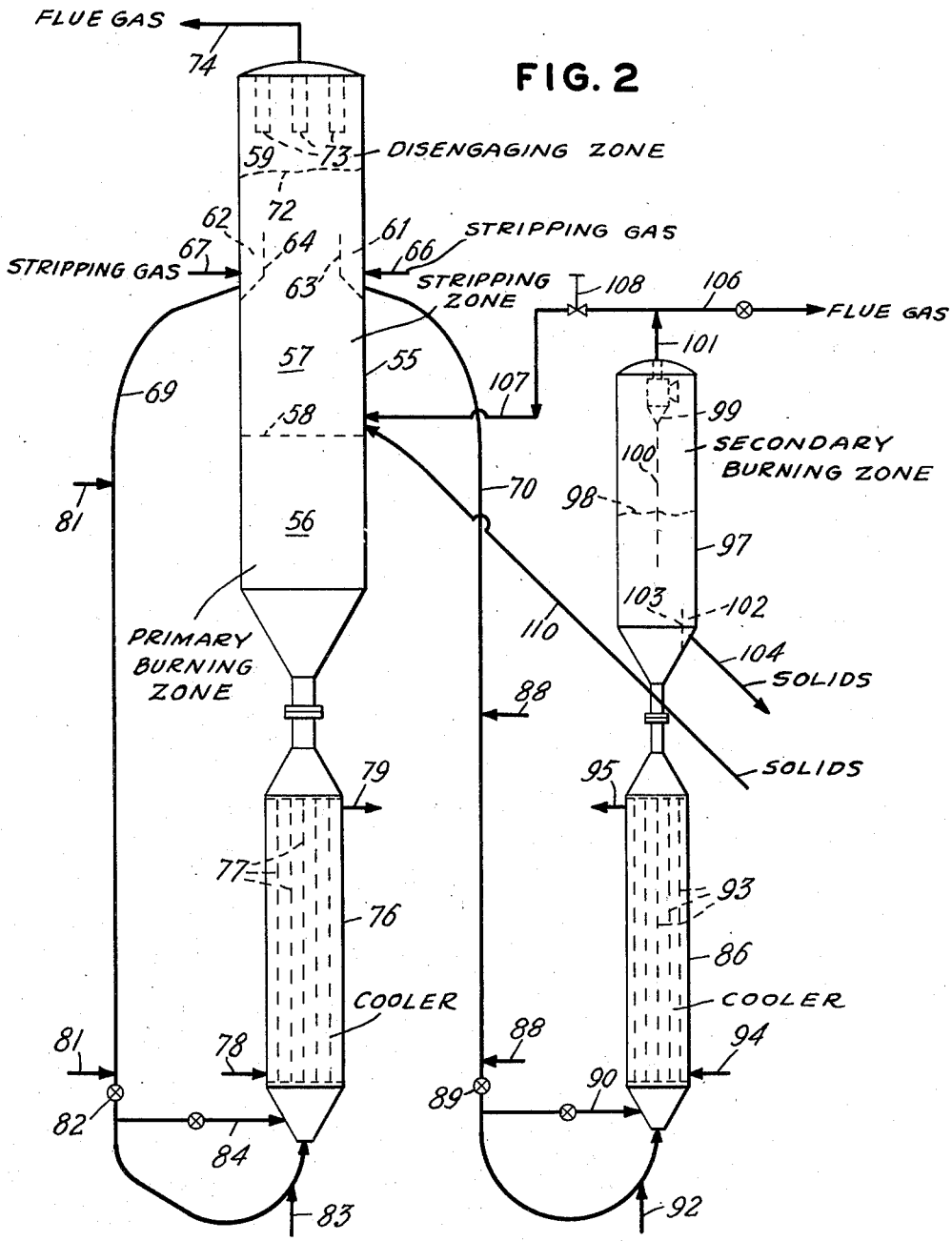

2,788,311

FLUID SYSTEM

Everett W. Howard, Glen Rock, N. J., and Henry P. Wickham, Glen Head, N. Y., assignors to M. W. Kellogg Co., Jersey City, N. J., a corporation of Delaware Application August 3, 1951, Serial No. 240,202

18 Claims. (Cl. 196—52)

This invention relates to improvements in systems of fluidized solids, and more particularly pertains to novel methods and means for removing heat from a combustion zone containing finely divided solids, and/or separating volatile material from such a type of solids. Still more particularly, the present invention relates to fluid hydrocarbon conversion systems wherein the heat of combustion in the regeneration zone is economically and effectively removed and/or the volatile carbonaceous material held by the solids is separated by means of combustion gases.

In accordance with the present invention, the improvement in fluid systems comprises commingling a mass of finely divided solids containing a small amount of combustible material with a mass of finely divided solids containing a larger amount of combustible material in a primary combustion zone wherein a portion of said combustible material is burned, cooling the solids and gaseous materials which flow from said primary combustion zone, separating the solids from gaseous material, recycling a portion of the separated solids to the aforesaid primary combustion zone, passing the remaining portion of separated solids to a secondary combustion zone wherein at least a portion of combustible material is burned, and thereby producing a mass of solids containing a reduced amount of combustible material.

In another aspect of our invention the improvement comprises passing a mass of solids containing combustible material to a primary combustion zone wherein at least a portion of the combustible material is burned, commingling the solids and gaseous materials produced in the primary combustion zone with a mass of finely divided solids containing volatile and non-volatile combustible materials in a primary stripping zone, optionally cooling the solids and gaseous materials which flow from the stripping zone, separating the solids from the gaseous materials, optionally stripping a portion of separated solids by means of a gas to remove volatile material, recycling the just mentioned separated solids to the primary combustion zone, passing the remaining portion of separated solids to a secondary combustion zone wherein at least a portion of the combustible material is burned and thereby producing a mass of solids containing a reduced amount of combustible material.

By means of the present invention, a two stage combustion system with intermediate cooling is proposed. In this system, a portion of the cooled solids stream is passed to the primary combustion zone wherein the content of combustible material on incoming solids from another source is completely or partially removed by burning. Thereafter, the entire mass of solids is cooled in an upflow cooler, and a portion is recirculated to the primary combustion zone. The remaining portion of solids, which is about the same amount as the high combustible content solids entering the primary combustion zone, except for any combustible material which has been removed, is passed to a secondary combustion zone wherein the combustible material content is reduced to a desired level and the solids attain a desired high temperature.

With respect to the feature of our invention where the solids containing a high combustible content are introduced into the primary stripping zone and wherein the solids and gaseous materials from the primary combustion zone are present, the outstanding advantage resides in substantially reducing the amount of volatile material contained in the incoming solids. The incoming solids containing a high combustible content, including volatile material, can be at a lower temperature than the solids and gaseous materials which are passed from the primary combustion zone. The temperature difference aids in the separation of volatile material held by the solids. Furthermore, the gaseous materials produced in the primary combustion zone are flue gases which ordinarily have little value. By means of this invention, these flue gases serve to separate volatile material from the solids.

The conditions existing in the stripping zone may comprise a part of a system which is different than what is described herein. In effect, this represents another aspect of our invention and comprises commingling combustion or flue gases, a mass of finely divided solids substantially free of volatile material and another mass of finely divided solids containing volatile material in an appropriate zone under conditions of temperature and pressure which are conducive to separation of volatile material from the solids.

Hence, our invention is applicable to fluidized systems for distilling volatile matter from powdered coal, hydrocarbon conversion, de-sulfurization, dehydrogenation, isoforming, etc.

The present invention is particularly applicable for hydrocarbon conversion systems wherein finely divided catalytic particles become temporarily deactivated by the deposition of carbonaceous material and thus require regeneration. The hydrocarbon conversion systems are, for example, hydroforming, cracking under hydrogen pressure, fluid catalytic cracking, etc. Under the present invention, these hydrocarbon conversion systems will employ, in general, finely divided catalytic particles having particle sizes of from about 5 to 150 microns or higher. More usually, the particle size of catalyst used in hydroforming, etc. is about 10 to 80 microns.

In the present invention, "carbonaceous material" is intended to include carbon and hydrocarbon materials. Further, by "gases" it is intended to include materials which are normally gases and/or vapors of substances which are normally liquid under atmospheric conditions of temperature and pressure.

Finely divided solids can be suspended in a gas phase and acquire the characteristics of a fluid, e. g. by being able to exert a fluistatic pressure, flow, etc. This is accomplished by passing a gas or vapor through a mass of finely divided solids to form what is commonly known as a fluidized mass. The fluidized mass will possess a density which depends on the particle sizes, the density of the particles, and the linear velocity of the gases and vapors passing through the mass of particles. Generally, for these hydrocarbon conversion systems, the superficial linear velocity of gases can be varied from about 0.1 to 6.0 feet per second, more usually about 0.3 to 2.5 feet per second for dense phase operation.

As one specific embodiment of our invention, a description will be had of the application of our process to hydroforming. Hydroforming is a catalytic reforming process for low octane naphtha, which process is accomplished in the presence of hydrogen and under other conditions so as to produce substantial amounts of aromatic compounds. The hydroforming reaction involves chiefly a dehydrogenation reaction of naphthenic compounds to form aromatics. To a lesser extent, the aliphatic hydrocarbons of at least 6 carbon atom chains are cyclized and dehydrogenated to produce aromatic compounds; and the 5 carbon atom ring compounds are isomerized to form aromatics. Hydroforming is, therefore, a very effective method of producing a highly aromatic hydrocarbon stock or is essentially a reforming operation for petroleum fractions to enrich the aromatic content.

In the hydroforming process various catalysts may be used depending upon the result desired. Generally, the catalysts include metals of groups 4, 5 and 6 of the periodic system, preferably in the form of oxides. Specific examples of metals which have been used in the hydroforming process are chromium, molybdenum, tungsten, titanium, cerium, thorium, etc. These metals are used as such or in the form of oxides; and can also be used alone or on various supports, such as for example, magnesia, alumina, silica or combinations of the foregoing, such as silica-alumina, silica-magnesia, etc. A very effective catalyst is molybdenum oxide impregnated on "activated alumina" or alumina gel in the amount of about 1 to 25% based on the weight of the total catalyst. Another very effective hydroforming catalyst is platinum or palladium supported on alumina.

A description of the amount and type of contacting between the hydroforming catalyst and reactant feed is conveniently expressed by the weight space velocity which is defined as the weight rate of oil feed in pounds per hour per pound of catalyst in the reaction zone. For the hydroforming reaction generally the space velocity is about 0.1 to 15, preferably about 0.5 to 5. The temperature at which the hydroforming reaction occurs is from about 850° F., and to about 1075° F.

Generally, the pressure at which the hydroforming reaction is most conveniently carried out is about 30 to 1000 pounds per square inch gauge, preferably about 50 to 500 pounds per square inch gauge. The amount of hydrogen used is conveniently defined as the standard cubic feet of hydrogen per barrel of oil feed (a barrel being 42 gallons). Generally, this rate is about 1000 to 10,000, preferably about 1000 to 5000 standard cubic feet per barrel of oil feed.

To better illustrate the present invention, reference will be had to the annexed drawings which form a part of this description and provide specific embodiments of our process and apparatus.

In the drawings:

Figure 1 is a schematic flow diagram illustrating one specific embodiment of our invention; and Figure 2 is a schematic flow diagram which illustrates a method of more effectively controlling the temperature of the solids and for utilizing more combustion gases in the stripping operation.

In Figure 1, there is illustrated the use of two separate combustion zones between which cooling of finely divided particles and stripping of volatile material therefrom are accomplished. In this figure, the lowermost body portion of the regeneration and stripping system is a vertical, cylindrical vessel 5. This vessel 5 contains an upper section 6 and a lower section 7 which are formed by a circular grid plate 8 covering the cross-section of the vessel. An oxygen-containing gas is introduced into the bottom of vessel 5 through a supply line 9. This oxygen-containing gas serves to burn all or part of the combustible material which is present with a stream of solids entering section or zone 7 at the bottom part thereof by means of recycle line or standpipe 10. Accordingly, zone 7 is the "primary combustion zone" for burning combustible material. The upper section 6 in vessel 5 serves to contact incoming contaminated solids with the combustion gases produced in the primary burning zone 7 in order to strip any volatile material therefrom. The contaminated solids are introduced into the bottom part of the stripping zone through transfer line or standpipe 11. In the event that the flue or combustion gases are not adequate for a particular purpose, additional gas can be fed into the stripping zone through supply line 12 which is connected to the bottom part thereof.

Vessel 5 is surmounted by another body portion which is in a vertical position and cylindrical in shape. This body portion is a cooling section 13 which contains a plurality of vertical tubes 14 disposed within the cooling section. The tubes 14 are arranged to receive materials flowing upwardly from the stripping zone 6. Cooling is accomplished by passing water from a supply line 15 into a boiler drum 16, from which the water is passed through line 17 into the shell side of the bank of tubes 14. The water is partially vaporized as a result of indirect exchange of heat through the tubes 14. The steam and water leave the cooler section 13 through a line 18 which is connected to the upper end of the cooler section. This mixture of steam and water is circulated back to the boiler drum 16 by means of line 18, wherein the steam is withdrawn through an overhead line and the water is again circulated to the cooler section.

After the solids and gaseous materials are cooled in the cooler section 13, they flow upwardly through an elongated section of vessel 19 wherein the gaseous component of the total stream is of sufficient velocity to carry the solids upwardly. The cross-section of the elongated section 19 is reduced substantially from that of vessel 5. This section 19 is surmounted by a vertical cylindrical vessel 20 of enlarged cross-sectional area. In the lower half of vessel 20, there are two wells 21 and 22 in diametrically opposite positions, which are formed by vertical transverse baffles 23 and 24, respectively. The baffles 23 and 24 are off-set from the vertical axis of elongated section 19, in order that there is no interference with the upwardly flowing materials. The cross-section between the baffles is substantially increased over the cross-section of elongated section 19, so that the solid material disengages from the gaseous materials and forms a dense bed having a level 25 in alignment with the top of baffles 23 and 24. The disengaged gases contain entrained solids which are recovered by means of filters 26 located in the top of vessel 20. The separated gases leave the system through a line 27 which is connected to all of the filters (not shown).

A portion of the disengaged solids in vessel 20 are passed to well 21, wherein stripping with a gas such as for example, steam, flue gas, nitrogen, oxygen, air, etc. is effected. The gas is charged into the bottom of the well 21 through supply line 28. After the solids have been countercurrently contacted with stripping gas in well 21, they flow into recycle line 10. The rate of flow of solids in this standpipe 10 is automatically controlled by means of slide valve 29. The solids are maintained in a fluid condition in this standpipe by means of aeration gas which is introduced into the line through a supply source 30, just above the location of the slide valve.

Another portion of the disengaged solids in vessel 20 is passed into well 22 which serves as the "secondary combustion or regeneration zone." The combustible material deposited on the solids is burned in this zone 22 by means of an oxygen-containing gas which is charged at the bottom of the zone through a supply line 31.

The solids are regenerated in zone or well 22 and then flow therefrom through a transfer line or standpipe 33. This standpipe is in a diagonal position connecting zone 22 with the bottom of a reactor vessel 35. The standpipe contains a slide valve 36 for automatically controlling the rate of flow in the line. Just above the slide valve, aeration gas is fed into the line through source 37 to prevent defluidization.

The reactor 35 is a vertical cylindrical vessel which has connected thereto a conical shaped body portion 39 as a bottom end. Inside the reactor and just above the conically shaped bottom 39 is a circular grid plate 40 which covers the cross-section of the vessel. The reactant materials in the case of hydroforming are naphtha and recycle gas. The recycle gas is fed into the bottom of the reactor, below the grid plate 40, by means of line 42; whereas the naphtha is fed from a header or supply line 43 and is distributed into the reactor, above the grid plate 40, by two oppositely disposed lines 44 and 45. These reactant materials contact a mass of fine catalytic solids to form a fluid bed having a level 47 in the upper part of the reactor. The gaseous product is disengaged from the catalyst bed, and enters a cyclone separator 48, wherein any entrained solids are recovered and returned to the fluid bed through dip-leg 49. The separated gaseous product leaves the cyclone through line 50 and is passed to a product recovery system (not shown). As a result of the hydroforming reaction, a carbonaceous material is deposited on the catalyst which lowers the catalyst activity. The catalyst is continuously withdrawn from the reactor through a well 51, which is located in the upper part of the reactor bed. The well is connected with the transfer line 11 by which the solids are passed into the stripping zone 6. This transfer line 11 contains a slide valve 52 for automatic control, and a supply source 53 for introducing aeration gases into the standpipe above the location of the slide valve 52.

The recycled finely divided solids which are introduced into combustion zone 7 by means of line 10, are in a fluid condition. This recycle line serves as a standpipe by providing a fluistatic pressure of sufficient magnitude to permit re-entry of solids into vessel 5. The solids in this standpipe can possess densities of about 15 to 50 pounds per cubic foot, preferably about 35 to 45. The recycled solids can enter combustion zone 7 in a direct manner as shown in Figure 1, or alternatively, standpipe 10 can combine with oxygen-containing gas inlet 9, and as a combined stream enter the bottom part of the combustion zone. The advantage in the arrangement shown in Figure 1 is that local overheating is avoided by introducing the streams separately into zone 7, where excessive rises in temperature are offset by the presence of larger quantities of cooler materials.

Our invention is practiced as a means of removing combustible materials from finely divided solids and producing a regenerated stream of solids having a desired elevated temperature. To attain the elevated temperature, part of the burning is effected in the secondary combustion zone represented as well 22 in Figure 1. Burning in the secondary zone is essential for this purpose, since the stream of gaseous materials and solids pass through cooler 13 after leaving stripping zone 6. By means of cooler 13, the solids may attain a temperature in the range of about 600° to 900° F., consequently some combustible material should be burned in the secondary combustion zone in order to produce a stream of regenerated solids having the desired elevated temperature, such as in the order of about 1000° to 1200° F. Temperatures in excess of 1200° F. are not sought for solids which serve as catalytic bodies, because at such higher temperatures the solids may undergo undesirable chemical and physical changes. The relative amounts of burning in the primary and secondary zones would be practiced with greater latitude, if additional cooling through some means other than cooler 13 were employed for the secondary burning zone. However, the use of the additional cooling means would necessitate additional costs of construction, operation, etc., and therefore it is preferred to practice our invention without the additional cooling. However, it should be understood that both methods of operation come within the scope of this invention.

To practice our invention so that a regenerated stream of solids having a desired elevated temperature is produced, without resorting to cooling in addition to what is obtained by means of cooler 13, consideration must be given to (1) the combustible content of the contaminated solids which enter the system in either stripping zone 6 or directly into primary combustion zone 7; (2) the combustible content of the stream of solids which leaves the primary combustion zone; (3) the temperature at which the stream of solids leaves the cooling section 13; and (4) the ratio of weight rates of the just-mentioned streams of solids which combine prior to entering the secondary combustion zone. The ratio of the weight of solids entering the primary combustion zone as a recycle stream to the weight of the solids entering the system in a contaminated state is defined hereafter as the "recycle ratio." As a practical matter, it is not advisable to cool the combined streams of solids below about 600° F., because the carbonaceous material which is usually produced in hydrocarbon conversion reactions may not burn at lower temperatures.

When cooling the solids to about 600° F. prior to the second combustion step, there is more latitude in the amount of burning which can take place in the secondary zone to obtain a product having a temperature of about 1000°–1200° F. The higher temperature favors burning still more carbonaceous material in the secondary zone. Under the most favorable conditions, there must be burning in both primary and secondary zones when the combustible content of the contaminated solids in line 11 is greater than 1.2% by weight and it is desired to produce a solid stream having a zero combustible content. Generally, if the solids in cooler 13 are not cooled below 600° F. and the solids in the secondary zone should not have a temperature greater than 1200° F., the maximum amount of burning in the secondary zone should not exceed 0.012 pounds of combustible material per pound of solids entering the secondary zone. The solids leaving the secondary zone may have a combustible content greater than zero. However, notwithstanding the above described conditions, it should be understood that our invention is also applicable to processing a contaminated solids stream containing less than 1.2% by weight of combustible material. In such a situation, the practice of our invention would be more flexible.

Generally, our invention is applied to situations wherein the contaminated solids in line 11 contain a combustible content of about 0.5 to about 10% by weight. The type of operations employed for this range of combustible content of solids will vary from one in which cooler 13 is the only cooling means, to an operation in which additional cooling must be furnished for the secondary combustion step.

When using only cooler 13 as the cooling means, an important variable in obtaining a solids temperature not greater than 1200° F. is the combustible content of the stream of solids leaving the primary combustion zone. With respect to the system employing a stripping zone above the primary combustion zone, the solid particles in this stream can undergo partial or complete burning so that the particles may contain little or no combustible material or a small amount of combustible material. Ordinarily, for any given combustible content, there are particles which contain less combustible material and some which contain more than the indicated analysis. Hence, in any stream of solids, the particles may contain from zero to a relatively high combustible content, and so the combustible content of any particular stream of solids represents the average value. This situation exists with respect to the contaminated solids. In the type of operation under consideration i. e. where cooling is effected solely by means of cooler 13, the stream of solids which leaves the primary combustion zone should contain a combustible content of less than about 1.2% by weight. The preferred situation is to remove all of the combustible material in the primary combustion zone which is present on the solids charged thereto, so that the recycle ratio is the least possible. The amount of magnitude of recycle ratio increases as the combustible content of the stream of solids leaving the primary combustion zone increases. For the system in which the contaminated solids are introduced directly into the primary burning zone along with the recycle solids stream, it is important that the stream leaving the primary zone does not contain more than 1.2% by weight of combustible material. The combustible content of this stream will be the same as the stream which is recycled to the primary zone.

If auxiliary cooling is furnished, in addition to cooler 13, our process can be operated so that the combustible content of the stream of solids leaving the primary combustion zone is higher than 1.2% by weight. Under such conditions, the combustible content of this stream can be as high as 5% by weight or higher. However, it is preferred to operate without the auxiliary cooling.

Ordinarily, the recycle ratio can be fixed by the combustible content of the stream of solids leaving the primary cobustion zone, the temperature desired in the secondary combustion zone, the amount of cooling, and the combustible content of the contaminated solids. This recycle ratio can vary considerably in view of the variables upon which it is dependent, however, it is desirable to have low recycle ratios in order that the size of standpipe 10 need not be excessive. Furthermore, high recycle ratios may require unusually large amounts of gases to lift the solids upwardly, and such a situation should be avoided whenever possible. Therefore, while it is possible to employ recycle ratios of up to about 100 or higher, more satisfactory results, from the standpoint of costs, etc., are obtained by using recycle ratios of about 1 to 15.

The introduction of solids and oxygen-containing gas can be regulated to maintain a fluidized mass of various densities in combustion zone 7 of vessel 5. Generally, the mass of solids in this combustion zone will have densities in the order of about 10 to 60, preferably about 15 to 25 pounds per cubic foot. A significant advantage in having finely divided solids containing little or no combustible material present in the combustion zone is that they serve as a means of lowering the temperature of combustion, and thus still permit the burning rate to be controlled when using undiluted air for combustion. It is also preferred to maintain a dense bed in this combustion zone in order to effectively control the temperature. By means of the dense bed, better contact is obtained between the solids containing large burning deposits and those which will undergo little or no burning, so that there is little or no tendency for local overheating of portions of the solids. Therefore, the portion of solids which are substantially inert in the combustion zone can aid in maintaining the regeneration temperature at about 700° to 1200° F., preferably about 950° to 1150° F.

The flue gases leaving the primary combustion zone 7 in vessel 5 are intermingled with spent solids containing volatile material in the stripping zone. Our process is operated to maintain the flue gases substantially free of unused oxygen in order to prevent undesirable burning of volatile material. The quantity of air employed in this primary combustion zone is preferably sufficient to burn all or less than all of the combustible material which is present. However, when the quantity of air is slightly greater than the theoretical value required to burn all of the combustible material, the unused oxygen which may be present in the flue gas does not cause any appreciable burning of volatile material.

The grid plate serving as a permeable element between the stripping and combustion zones, causes the superficial linear velocity of the gases to increase. This increase in gas velocity is accompanied by a pressure drop so that the gases, etc. will distribute uniformly over the cross-sectional area of the vessel. Furthermore, such an arrangement tends to prevent any back-flow of materials from the upper stripping zone 6 to the lower situated primary combustion zone 7. In place of the grid plate, the permeable element can be also a plate with a single opening of suitable reduced cross-sectional area, or the combustion and stripping zones can be joined by a venturi-shaped vessel portion of a suitable reduced cross-sectional area.

In the stripping zone 6, finely divided solids containing occluded volatile material and/or non-volatile combustible material mix with the combustion zone effluent. The linear velocity of the effluent from the combustion zone is sufficiently high to cause turbulent mixing with incoming contaminated solids. The density of the fluidized mass as a result of mixing these two streams of solids will vary in the range of about 10 to 50 pounds per cubic foot. However, less dense masses of solids can be obtained by introducing a suitable gas, such as for example, flue gas, steam, nitrogen, etc. through line 12. The additional amount of gas can lower the density to about 1 to 30 pounds per cubic foot. Another effect which takes place in the stripping zone is that the combustion zone effluent is reduced in temperature by means of the incoming solids, etc., which are at lower temperature than the said effluent. This effect may be desirable from the standpoint of less cooling capacity being required in the system.

It is preferred to operate our process using a dense phase of solids in the stripping zone. As previously indicated, it is the purpose of the stripping zone to separate or remove volatile material from the finely divided solids. This separation is favored by long residence times and high temperatures. Therefore, by using a dense bed in the stripping zone, the residence time of the solids is increased, and further, the rate of heat exchange between the materials flowing from the combustion zone and those entering the stripping zone from the reactor is increased by reason of the better contact obtained in a dense bed.

The linear velocities of gases in the stripping zone are generally in the order of about 0.3 to 3.0 feet per second. The velocity used should be sufficient to carry solids from the stripping zone into the cooling section 13. As previously indicated, the velocities of these gases can be increased by introducing additional quantities of gases through line 12. However, another method of increasing these velocities is to reduce the cross-sectional area of the stripping zone.

The temperature of the combustion zone effluent is ordinarily higher than the temperature of the contaminated solids entering through line 11 and of the auxiliary gas stream which is fed through line 12. This temperature differential causes improved stripping of volatile material from the solids. For example, usually, the temperature of combustion will be about 1050° to 1100° F., whereas the temperature of the contaminated solids entering the stripping zone is about 850° to 1000° F., preferably about 900° to 950° F. When the above streams are the only two entering the stripping zone, the resultant temperature is about 950° to 1150° F., preferably about 1000° to 1100° F. However, this temperature can be either increased or decreased by passing a heated gas stream through line 12. Consequently, under such circumstances the temperature of the stripping zone can be readily maintained at about 1000° to 1150° F.

The entire mixture which flows from the stripping zone comprises stripped contaminated solids, combustion zone solids effluent, flue gas, optional auxiliary gases and separated volatile matter. This mixture, by entering the cooling section, may be lowered from a high temperature of about 1100–1150° F. to a lower temperature of about 600–900° F. Generally, the stripping zone effluent is passed through a series of cooling zones of reduced cross-sectional area so that the velocity is increased and the solids are effectively carried upward.

In the cooling section, the solids ordinarily pass through at a density of about 1 to 15, preferably about 3 to 8, pounds per cubic foot. These densities are maintained by superficial gas velocities in the order of about 10 to 30, preferably about 15 to 20, feet per second.

After the solids are cooled, the entire mass is passed into the disengaging zone wherein gases and volatile matter are substantially separated from the solids and passed overhead from the system. The solids settle into a fluidized mass having a density of about 15 to 50 pounds per cubic foot, and these densities may be maintained by using additional aeration gases, if necessary. These gases may be introduced into this zone at various points not shown in the drawing. Ordinarily, the gaseous materials flowing through the disengaging zone will have a superficial linear velocity of about 0.1 to 2.0 feet per second, preferably about 0.5 to 1.0 foot per second, and they are sufficient, ordinarily, to maintain the desired fluidization of solids in the disengaging zone.

As previously indicated, the relative superficial linear velocities of gases may vary merely by changing the cross-sectional areas of the various processing zones. In this respect, ordinarily, the processing zones will have the following relationships. The ratio of cross-sectional area of a tube 14 in cooler section 13 to the total cross-sectional area of all the cooling tubes 14 is in the order of about 0.1–0.02:1, preferably about 0.08–0.03:1. The ratio of cross-sectional area of stripping zone to total cross-sectional area of the cooling section 13 is about 30–100:1, preferably about 40–70:1. As for the disengaging zone, the ratio of cross-sectional area thereof to total cross-sectional area of cooling section 13 is about 50–150:1, preferably about 60–100:1.

A portion of the solids in vessel 20 passes into stripping well 21 wherein it is contacted with a gas, such as for example steam, nitrogen, carbon dioxide, flue gas from burning carbonaceous material, etc., which is introduced through a supply line 28. The amount of gas used is about 0.001 to 20, preferably about 01. to 3 standard cubic feet per pound of solids entering the stripping well. The temperature in this well can be the same as the solids flowing from cooler 13, or it can be varied over the range of about 500° to 1000° F., by using a stripping gas at a lower or higher temperature than the catalyst to be stripped. This temperature can be maintained by other suitable means. The stripped solids leaving well 21 are then recycled to the combustion zone 7.

As previously indicated, a portion of the solids entering the disengaging zone passes into stripping well 21. The remaining portion of the solids is passed to well 22 wherein combustion of combustible material occurs. The rate of solids flowing to this secondary combustion zone is about the same as the rate of solids entering the stripping zone 6 from the reactor, minus any combustible material which has been removed. In this secondary burning zone, about 100 to 250 standard cubic feet of air per pound of carbonaceous material present on the solids, preferably about 180 to 200, are used for regeneration. The temperature of burning is maintained at about 1000° to 1200°, preferably about 1075° to 1100° F. Under these conditions, the density of the fluidized mass is in the order of about 20 to 50 pounds per cubic foot, perferably about 25 to 40. These densities are maintained by superficial linear gas velocities of about 0.2 to 3.0 feet per second, preferably about 0.3 to 1.5 feet per second. From the standpoint of stripping efficiency, it is desirable to burn less combustible material in this secondary zone than in the primary combustion zone, in order that larger quantities of flue gas are available for stripping.

In the flue gases leaving the secondary combustion zone, the unused oxgyen will tend to burn the voltatile matter with which it mixes prior to leaving the disengaging zone. Ordinarily, burning in the secondary zone is conducted under such conditions that substantially all of the oxygen is consumed in burning combustible material. However, in the event that small amounts of unused oxygen remain, no serious consequences result.

The combustible material on the solids can be reduced by burning in the secondary zone to any level desired. Usually the burning is controlled so that the solids leaving this zone will contain a combustible content of about 0.0 to 0.20%, preferably about 0.0 to 0.10%, based on the total weight of solids.

The process shown in Figure 1 can be manipulated to effect a heat balance operation i. e. where the quantity of heat required in, for example, the reaction zone is supplied by the solids which have been subjected to combustion conditions. Ordinarily, the catalyst to oil ratio is about 0.05 to 1.0 without heat balance; whereas for a heat balance operation the catalyst to oil rate is about 0.5 to 5.0. The outlet temperature of the cooling section 13 in such an operation is about 1075° to 1100° F. Whenever possible, the temperature of combustion in the combustion zones should be increased.

The combination of a stripping zone superimposed on a combustion zone and in open communication therewith represents a unique apparatus arrangement. This type of arrangement can be used for such purposes as regenerating spent catalysts in fluidized systems, distillation of coal, production of chemicals by hydrogenating carbon oxides, etc. Likewise, a cooler section and disengaging zone containing a secondary burning zone, respectively, superimposed on the stripper-combustion zone combination is an apparatus arrangement which has many useful purposes for the type of operations just described. Similarly, the process just described has utility for many purposes, either as a complete system in itself, such as for example, in distilling coal, or as part of a general operation, such as for example, in hydrocarbon conversion, etc.

An example of a commercial-size unit with respect to hydroforming is as follows:

For commercial application, vessel 5 is about 1.5 feet in internal diameter and 8 feet in length and contains grid plate 8 at about 4 feet above the bottom thereof. Cooling section 13 is about 2 feet in internal diameter and 42 feet in length and provided with 24 tubes shown as number 14 in the drawing. Each tube has a one inch internal diameter and is 30 feet in length. Vessel 20 is about 2 feet 3 inches in internal diameter, and 25 feet in length and well 22 encloses a section of about 5 cubic feet. Stripping well 21 is about 5 cubic feet in volume. The catalyst level in vessel 20 is about 15 feet from the top of the vessel 20. Reactor 35 is about 6.5 feet in internal diameter and 60.5 feet in length. The reactor bed depth will be about 45.5 feet. Grid plate 40 is positioned about 60.5 feet from the top of reactor 35.

In the reaction zone of a hydroforming operation, the superficial linear velocity of reactant gas passing through the fluidized mass should be sufficient to maintain a dense phase of catalyst. These velocities are in the order of about 0.3 to 6.0, preferably about 0.5 to 1.5 feet per second. As would be expected, the density of the fluidized mass will depend in part upon the superficial linear gas velocity as well as other factors; however, in general, the process is operated so that densities of about 20 to 80 pounds per cubic foot, preferably about 25 to 40 pounds per cubic foot, are obtained.

In a typical full scale operation of a hydroforming process, naphtha is fed through line 43 at the rate of about 2000 barrels per day. (A barrel is equal to 42 gallons.) Through line 42, recycle gas from the product recovery system is introduced into reactor 35 at the rate of about 7000 standard cubic feet per minute (or 15,400 pounds per hour). This recycle gas contains about 60–70 volume percent of hydrogen. The catalyst holdup or inventory in reactor 35 is about 25 tons and catalyst is withdrawn through line 11 from the upper portion of the bed at the rate of about 8000 pounds per hour. The temperature at grid 40 of the reactor is in the order of about 940° F., whereas the temperature at the upper part of the fluid bed is about 920° F. The catalyst withdrawn from reactor 35 via line 11 contains about 5% by weight of carbonaceous deposits, based on the total weight of catalyst. The reaction is conducted at a pressure of about 250 p. s. i. g. in the upper part of the vessel.

In vessel 5, below grid plate 8, recycle catalyst is introduced through line 10 at the rate of about 41,000 pounds per hour and is mixed with air which is introduced through line 9. The air rate is 3070 pounds per hour. The carbonaceous material deposited on the catalyst is burned by means of the air and then the stream of catalyst is lifted in a vertical direction through grid plate 8 into the upper section of vessel 5, wherein it is mixed with spent catalyst. The temperature of the mass in the upper section of the stripping zone is about 1100° F. All of the materials in the stripping zone above grid plate 8, pass upwardly into cooling section 13, wherein the materials flow through tubes or conduits 14 and are cooled to about 800° F. After the catalyst is cooled it passes upwardly into vessel 20 wherein the gases and vapors are separated therefrom and leave via line 27. The separated catalyst forms a fluid bed, a portion of which passes into well 22 and is contacted with air which is introduced through supply line 31 at the rate of 630 pounds per hour. The remaining portion of catalyst flows into stripping well 21, and is contacted with 50 pounds of steam per thousand pounds of catalyst circulated. After stripping, the catalyst is recycled via line 10 into the regeneration zone which is the lower part of vessel 5. The catalyst which is regenerated in well 22 is returned at a temperature of 1100° F. to the bottom part of reactor 35 via line 33.

In the operation described above, the catalyst employed contains 9% by weight of molybdenum oxide on alumina gel based on the total weight of catalyst. This catalyst has particle sizes having the approximate following analysis:

| | Percent |
|---|---|
| 0–10 microns | 10 |
| 0–20 microns | 35 |
| 0–40 microns | 75 |
| 40+ microns | 25 |

As a result of regeneration, occasionally, the molybdenum oxide type of catalyst appears to undergo some change which is manifested as a drop in activity. To overcome this difficulty, the catalyst may be treated with hydrogen or a hydrogen-containing gas in a reducing vessel (which is not shown in the drawing) just after regeneration.

The process and apparatus illustrated by Figure 1 can be modified to provide a system for employing two regeneration zones and an intermediate cooling zone therebetween, without the stripping step which is effected by means of stripping zone 6 in vessel 5. In this system, the solids containing combustible material may be optionally subjected to preliminary stripping by means of a gas prior to entering primary combustion zone 7. The stripping zone 6 and grid plate 8 are eliminated, so that the combined streams of recycle solids (introduced through line 10) and contaminated solids (entering through line 11) are subjected to combustion conditions in zone 7. The solid and gaseous effluents from this combustion zone are passed directly into the cooler 13. The apparatus and process conditions in this type of operation are the same as given above in connection with the description of Figure 1. The only difference being that stripping zone 6 is eliminated and the solids containing combustible material are introduced directly into zone 7 by means of line 11.

Figure 2 is a schematic flow diagram which illustrates separate cooling of the recycled solids flowing to the primary combustion zone and for the solids which are to undergo burning in the secondary zone, along with the recycling of flue gases from the secondary burning zone to the stripping zone. In the drawing, vessel 55 is a vertical cylindrical body which is composed of three sections, namely: a lowermost zone or primary burning zone 56, a middle or stripping zone 57 which is above zone 56 and separated therefrom by a circular grid plate 58 and a top or disengaging zone 59. Between the stripping zone 57 and the disengaging zone 59 there are situated two wells 61 and 62 along the wall of the vessel 55 which are formed by two baffles 63 and 64, respectively. These baffles contain a vertical straight side and a bottom which slants downwardly at an angle from the straight side to the vessel wall. These baffles form segmental wells 61 and 62 on the sides of vessel 55. A stripping gas is fed into the bottom of well 61 by supply line 66, and likewise, a stripping gas is charged into the bottom of well 62 through supply line 67. Solids leave well 62 through a recycle line or standpipe 69 which is connected to the bottom part of the well. Similarly, solids are discharged from the bottom part of well 61 into a standpipe 70. The superficial linear velocity of gases passing upwardly in zone 59 is sufficient to disengage the solid material which then forms a bed having a level 72. The gaseous materials flow upwardly through filters 73 at the top of the disengaging zone and thence leave the system through line 74, which is connected to the filters in a manner not shown.

Vessel 55 surmounts another vertical cylindrical vessel or cooler 76. This cooler contains a plurality of internal vertical tubes 77. The design of this upflow cooler is essentially the same as given in Figure 1. The cooling liquid is introduced at the bottom of the cooler through line 78, it passes through the shell side of the tubes in the cooler and leaves the cooler by means of line 79 which is located at the top of the cooler. The solids which are recycled from well 62 in the disengaging zone to cooler 76, pass through the standpipe 69 which contains aeration gas supply lines 81 along the length thereof to prevent defluidization of the solids. The rate of flow of solids is automatically controlled by means of slide valve 82. The recycled solids may combine with an oxygen-containing gas from a supply source 83 prior to entering the cooler 76, or the solids may be recycled from a valved line 84 directly into the cooler. By this latter scheme, the oxygen-containing gas commingles with the solids inside the cooler.

The solids which have undergone an initial burning treatment are circulated through well 61 into standpipe 70 which is connected to the bottom of a vertical cylindrical cooler 86. This cooler is of the upflow type and is similar to cooler 76 which is described hereinabove. Standpipe 70 contains aeration lines 88 along the length thereof in order to insure fluidization of the downflowing solids. The rate of flow of solids is automatically controlled by means of slide valve 89 which is installed in the standpipe 70. The solids in the standpipe may enter the cooler 86 directly by means of valved line 90 or they can combine with oxygen-containing gas from line 92 prior to entering the bottom of the cooler. This cooler 86 contains internal vertical tubes 93, a cooling liquid inlet 94 at the bottom and an exit line for the cooling medium 95 at the top.

The cooler 86 is surmounted by another vertical cylindrical vessel or secondary burning vessel 97. The upper part of the burning vessel 97 contains a cross-sectional area which is sufficient to cause disengagement of solids from the gaseous materials which have a superficial linear velocity of about 0.1 to 2.0 feet per second. The disengaged solids form a fluid bed having a level 98. The disengaged gases pass into a cyclone separator 99 which is located in the top of burning vessel 97. The entrained solids which are separated from the upflowing gases are returned to the fluid bed by means of cyclone dipleg 100, whereas the flue gases leave the system through discharge line 101. The solids present as a fluid bed in burning vessel 97 are withdrawn through a segmental well 102 which is formed by a vertical transverse baffle 103 in the lower part of the vessel 97. The solids flow from the well into a line 104 which may be connected to a process vessel which utilizes the solids (not shown).

The flue gas leaving the burning vessel 97 may be divided so that a portion is vented through a valved line 106 or the entire flue gas is recycled to the stripping zone 57 to serve as a stripping gas. The recycle flue gas is charged to the bottom of the stripping zone 57 by means of a line 107 which is connected to the exit line 101 at the top of the burning vessel 97. This recycle flue gas line contains a control valve 108 for automatically regulating the flow of flue gas to the stripping zone. In addition to the flue gas entering the stripping zone via line 107, the contaminated solids are introduced into the bottom of the stripping zone through line 110. The other end of line 110 is connected to the process vessel (not shown) from which the contaminated solids are fed.

The process variables in Figure 2 can be varied over the ranges specified above in connection with Figure 1, with or without the following variations. The temperature of recycle solids can be maintained in the range of about 700° to 1000° F., preferably about 750° to 850° F.; whereas the temperature of the solids entering the secondary zone of burning can be kept in the range of about 1000° to 1150°, preferably about 1075° to 1100° F. Solids can be withdrawn from the bottom of the secondary burning zone and recycled through the cooler 86 (not shown). This provides an auxiliary means of cooling. The flue gas which is produced in the secondary burning zone is recycled to the stripping zone at the rate of about 500 to 3000 pounds per hour, preferably about 700 to 1500 pounds per hour. The temperature of this flue gas stream can be maintained at an elevated temperature in the order of about 1075° to 1100° F., or lowered to about 1000° to 1050° F. It is preferred to keep the temperature of this flue gas stream at a high level so that improved stripping effects may be obtained when the contaminated solids are contacted therewith. It is preferred to maintain the flowing solid streams in dense phase in all of the process vessels, coolers, etc. for the reasons given hereinabove.

The combination of processing vessels in Figure 2, represents a unique apparatus arrangement, in that, a cooler is superimposed by the burning and stripping vessels, all of which are in open communication with one another. Likewise, the entire structure of cooler, burner, stripper and separating vessel is a unique apparatus arrangement which provides a multiple purpose compact system. The apparatus shown in Figure 2 can be used for such purposes as regeneration of catalyst in a hydrocarbon conversion system, distillation of coal, synthesis of chemicals from the hydrogenation of carbon oxides in the presence of finely divided catalytic solids, etc.

Having thus described our invention by providing specific illustrations thereof, it should be understood that no undue limitations and restrictions are to be imposed by reason thereof. Various modifications as to size and shape and arrangement of vessels may be resorted to without departing from the spirit and scope of this invention.

We claim:

1. A process which comprises subjecting a fluidized mass of finely divided solids containing combustible material to burning with an oxygen containing gas in a primary combustion zone such that part of the combustible material is burned, combining the solids thus treated in the primary combustion zone with a fluidized mass of finely divided solids containing a greater combustible material content, cooling the mixture of solids, passing a portion of the cooled solids to a second combustion zone wherein at least part of the combustible material is burned by means of an oxygen containing gas, and passing the remaining portion of cooled solids to the primary combustion zone.

2. A hydrocarbon conversion process wherein gaseous reactants are contacted with a fluidized mass of finely divided catalytic solids and a carbonaceous material is deposited on the solids, the method of regenerating a catalyst which comprises subjecting a fluidized mass of finely divided catalytic solids containing carbonaceous material to burning by means of an oxygen containing gas in a primary combustion zone such that part of the carbonaceous material is burned, combining a fluidized mass of finely divided catalytic solids containing carbonaceous material in an amount greater than about 1.2% by weight with the solids which were previously treated in the primary combustion zone, cooling the mixture of catalyst to a temperature of about 600° to about 900° F., passing a portion of the cooled catalyst to a secondary combustion zone wherein not more than about .012 pounds of carbonaceous material per pound of catalyst are burned with an oxygen containing gas at a temperature of about 1000° to about 1200° F. and passing the remaining portion of cooled catalyst to the primary combustion zone.

3. A process which comprises subjecting to burning a fluidized mass of finely divided solids containing combustible material in a primary combustion zone such that part of the combustible material is burned, commingling the solids thus treated and the combustion gases produced in said primary zone with a fluidized mass of finely divided solids containing volatile and non-volatile combustible material in a stripping zone, cooling the mixture of solids, separating the cooled solids from the gaseous materials, circulating a portion of the separated solids to the primary combustion zone, and passing the remaining portion of the separated solids to a secondary combustion zone wherein at least a part of the combustible material is burned.

4. A process which comprises subjecting to burning a fluidized mass of finely divided solids containing combustible material in a primary combustion zone such that part of the combustible material is burned, commingling the solids thus treated and the combustion gases produced in said primary combustion zone with a fluidized mass of finely divided solids containing volatile and non-volatile combustible material in a stripping zone which is in open communication with said primary combustion zone cooling the mixture of solids, separating the cooled solids from the gaseous materials, circulating a portion of the separated solids to the aforementioned primary combustion zone, and passing the remaining portion of separated solids to a secondary combustion zone wherein at least part of the combustible material is burned.

5. In a hydrocarbon conversion process wherein gaseous reactants are contacted with a fluidized mass of finely divided catalytic particles in a reaction zone and a reaction product is thus formed which is separated from the catalyst which is contaminated with volatile and non-volatile carbonaceous material as a result of hydrocarbon conversion; the steps including the withdrawal of at least a portion of the contaminated catalyst from the reaction zone and introducing same into a stripping zone wherein a mixture of combustion gases and catalyst substantially free of volatile material is commingled therewith, cooling the catalyst and gaseous stream flowing from the stripper, separating the catalyst from gaseous materials, passing a portion of the cooled separated catalyst to a secondary combustion zone wherein at least part of the carbonaceous material is burned to produce a regenerated catalyst for re-use in the aforesaid reaction zone, passing the remaining portion of cooled separated catalyst into a primary combustion zone wherein part of the carbonaceous material is burned and the combustion gases and catalyst thus produced are passed to the stripping zone.

6. In a hydrocarbon conversion process wherein gaseous reactants are contacted with a fluidized mass of finely divided catalytic particles in a reaction zone and a reaction product is thus formed which is separated from the catalyst which becomes contaminated with volatile and non-volatile carbonaceous material as a result of hydrocarbon conversion; the steps including the withdrawal of at least a portion of the contaminated catalyst from the reaction zone containing more than about 1.2% by weight of carbonaceous material and introducing same into a stripping zone wherein a mixture of combustion gases and catalyst substantially free of volatile material is commingled therewith, cooling the entire mixture containing the catalyst to a temperature of about 600° to 900° F., separating the cooled catalyst from gaseous materials, passing a portion of the cooled catalyst to a secondary combustion zone wherein not more than .012 pounds of carbonaceous material per pound of catalyst is burned and the temperature is maintained at about 1000° to about 1200° F. thereby producing a catalyst for re-use in the reaction zone, and passing the remaining portion of cooled catalyst to a primary combustion zone wherein part of the carbonaceous material is burned and the combustion gases thus produced along with the catalyst are passed to the stripping zone.

7. In a hydroforming operation wherein a naphtha and a hydrogen-containing gas are contacted with a fluidized mass of finely divided hydroforming catalyst and the reformed product thus produced is separated from the catalyst which becomes contaminated with volatile and non-volatile carbonaceous material as a result of reforming the naphtha; the improvement which comprises withdrawing at least a portion of the contaminated catalyst from the reaction zone and passing same into a stripping zone wherein a mixture of combustion gases and catalyst substantially free of volatile material is contacted therewith, passing the entire mixture from the stripping zone into a cooling zone wherein the temperature is reduced to about 600° to 900° F., separating the cooled catalyst from the gaseous material, passing a portion of the separated catalyst to a secondary combustion zone wherein not more than about .012 pound of carbonaceous material per pound of catalyst are burned at a temperature of about 1000° to 1200° F. to produce a catalyst for re-use in the reaction zone, and passing the remaining portion of separated catalyst to a primary combustion zone wherein part of the carbonaceous material on catalyst is burned and the combustion gases thus produced along with the catalyst are passed into the stripping zone.

8. In a hydroforming operation wherein a naphtha and a hydrogen-containing gas are contacted with a fluidized mass of finely divided reforming catalyst and a reformed product thus produced is separated from the catalyst which becomes contaminated with volatile and non-volatile carbonaceous material as a result of reforming the naphtha; improvement which comprises withdrawing at least a portion of the contaminated catalyst from the reaction zone and passing the same into a stripping zone wherein the mixture of combustion gases and catalyst substantially free of volatile material is contacted therewith passing the gaseous and catalytic material from the stripping zone to a cooling zone, separating the cooled catalyst from the gaseous material, passing a portion of the separated catalyst to a secondary combustion zone wherein at least part of the carbonaceous material on catalyst is burned, contacting the remaining portion of separated cooled catalyst with a stripping gas, and recirculating the stripped cooled catalyst to a primary combustion zone wherein part of the carbonaceous material on catalyst is burned and the combustion gases thus produced along with the catalyst are passed into the stripping zone.

9. An apparatus comprising in combination a primary combustion means of enlarged cross-sectional area which is adapted to burn combustible material, a stripping means super-imposing said primary combustion means and in open communication therewith whereby finely divided solids and gases are received therefrom, a permeable means separating said primary combustion means and said stripping means, means for introducing finely divided solids to said stripping means, means for introducing gaseous and solid materials to said primary combustion means, an elongated confined means superimposed on said stripping means and of reduced cross-sectional area relative thereto, a cooling means superimposed on said elongated confined means whereby a gaseous suspension of finely divided solids is received therefrom, a disengaging means superimposing said cooling means whereby the solids are separated substantially from the gaseous material received from the cooling means, a secondary combustion means for treating a portion of the separated solids, means for passing separated solids to the primary combustion means, means for withdrawing solids from the secondary combustion means, and means for discharging gases from the secondary combustion means.

10. The apparatus comprising in combination a primary combustion means of enlarged cross-sectional area, means for introducing oxygen-containing gas into said primary combustion means, means for introducing finely divided solids containing combustible material into said primary combustion means, an elongated confined means superimposing said primary combustion means and of substantially smaller cross-sectional area relative thereto a cooling means superimposed on said elongated confined means and in open communication therewith, a disengaging means superimposed on said cooling means and in open communication therewith whereby solids are disengaged from the gaseous material, a secondary combustion means which is adapted to receive solids from said disengaging means, means whereby an oxygen-containing gas is introduced into said secondary combustion means, means whereby solids are withdrawn from the secondary combustion means, means whereby gaseous materials are discharged from the disengaging means, and means whereby solids are passed from the disengaging means to the aforesaid primary combustion means.

11. The apparatus comprising in combination a containing means of enlarged cross-sectional area having a permeable means of reduced open cross-sectional area whereby the containing means is divided into an upper stripping zone and a lower primary combustion zone, means whereby oxygen-containing gas is fed into the primary combustion zone, means whereby solids containing volatile and non-volatile combustible material are fed into the stripping zone, an elongated confined means superimposing said stripping zone and of substantially reduced cross-sectional area relative thereto, a cooling means superimposed on the elongated confined means and adapted to receive solid and gaseous materials therefrom, disengaging means superimposed on said cooling means whereby the solids are separated from the gaseous materials, a secondary combustion means situated within said disengaging means and adapted to receive solids from the disengaging means, means whereby an oxygen-containing gas is fed into the secondary combustion means, means whereby solids are withdrawn from the secondary combustion means and means whereby solids are passed from the disengaging means to the primary combustion zone.

12. The apparatus comprising in combination a vertical vessel of enlarged cross-sectional area containing a permeable element of reduced open cross-sectional area whereby the vessel is divided into an upper stripping zone and a lower primary combustion zone, means whereby oxygen-containing gas is fed into the primary combustion zone, means whereby solids containing volatile and non-volatile combustible material are fed into the stripping zone, a vertical conduit superimposed on said stripping zone and of substantially reduced cross-sectional area relative thereto an elongated vertical cooling means superimposed on said vertical conduit and adapted to receive solids and gaseous materials therefrom, a vertical disengaging vessel of enlarged cross-sectional area superimposed on said cooling means and adapted to disengage solids from gaseous materials, a segmental combustion well situated within said disengaging vessel in a position such that it does not interfere with upflowing materials from said cooling means and adapted to receive solids from the disengaging vessel, means for introducing oxygen-containing gas into said combustion well, means for withdrawing solids from the combustion well, and means for recirculating solids from the disengaging vessel to the primary combustion zone.

13. An apparatus comprising in combination a vertical cylindrical vessel containing a grid therein such that there is provided an upper stripping zone and a lower primary combustion zone, means for introducing finely divided solids containing combustible material and gaseous material into said primary combustion zone, a vertical cylindrical conduit superimposed on said stripping zone and of substantially smaller cross-sectional area relative thereto whereby solids and gaseous material are received from the stripping zone, a vertical cooling means superimposed on the vertical conduit and which is adapted to receive gaseous and solid materials therefrom, a vertical cylindrical disengaging vessel of enlarged cross-sectional area relative to the cooling means and superimposed thereon whereby solids are disengaged from suspension in a gaseous material, a segmental combustion well situated within said disengaging zone in a manner such that it does not interfere with the upflow of solids and gaseous material in the disengaging vessel and it is adapted to receive solids therefrom, means whereby an oxygen containing gas is introduced into said combustion well, means whereby solids are withdrawn from the combustion well, means whereby solids are passed from the disengaging vessel to the primary combustion zone, and means whereby gaseous materials are withdrawn from the said disengaging vessel.

14. A process which comprises burning a fluidized mass of finely divided solids containing combustible material in a primary combustion zone thus reducing the combustible material content, passing the solids of reduced combustible content to a stripping zone to which there is also charged the combustion gases from the primary combustion zone and a fluidized mass of finely divided solids containing combustible material including volatile components such that the volatile combustible material is separated from the solids, separating the gaseous material from the solids withdrawn from the stripping zone, recirculating a portion of the separated solids to a cooling zone, passing the cooled solids to the primary combustion zone, passing another portion of the separated solids to a second cooling zone, passing the cooled solids from the second cooling zone to a secondary combustion zone wherein the combustible material contained by the solids is at least partly removed by burning and the temperature of the solids is raised to a desired temperature, and then separating the solids from the combustion gases.

15. The process of claim 14 which is further characterized by recycling at least a portion of the combustion gases from the secondary combustion zone to the stripping zone.

16. A hydrocarbon conversion process wherein hydrocarbon reactant is contacted with a fluidized mass of finely divided catalytic solids in a reaction zone thus producing a desired product and contaminating the solids with combustible material and maintaining a heat balance system by using a catalyst to oil ratio of about 0.5 to about 5.0; the steps including the withdrawal of solids from the reaction zone and passing same to a stripping zone, removing combustible material from a fluidized mass of finely divided catalytic solids in a primary combustion zone by burning, passing the solids thus regenerated along with the resultant combustion gases to the stripping zone in order to strip any volatile material from the solids containing combustible material, passing gaseous materials and solids from the stripping zone to a cooling zone wherein the temperature is reduced, separating the cooled solids from the gaseous materials, passing a portion of the cooled solids to the primary combustion zone, passing another portion of cooled solids to a secondary combustion zone wherein the combustible material content is reduced and the temperature of the solids raised, and then circulating regenerated solids from the secondary combustion zone to the reaction zone at a rate sufficient to maintain the desired catalyst to oil ratio.

17. A process which comprises passing an oxygen containing gas upwardly through a mass of finely divided solids containing combustible material to form a dense fluidized mass in a primary combustion zone and thereby reduce the combustible material content by burning, passing a gaseous suspension of finely divided solids as a relatively lean phase from the primary combustion zone to a cooling zone wherein the temperature of the solids is reduced, passing the cooled gaseous suspension of solids as a relatively lean phase to a separating zone wherein the solids are separated from the gaseous material, passing a portion of the cooled separated solids to the primary combustion zone as a dense fluidized mass, and passing another portion of the cooled separated solids to a secondary combustion zone wherein such solids are contacted with an oxygen containing gas to form a dense fluidized mass in order to reduce the combustible material content thereof by burning.

18. A process which comprises passing an oxygen containing gas upwardly through a mass of finely divided solids containing combustible material to form a dense fluidized mass in a primary combustion zone and thereby reduce the combustible material content by burning, passing solids from the primary combustion zone as a suspension in the combustion gases produced therein to a stripping zone wherein such solids are maintained as a dense fluidized mass, passing to the stripping zone a mass of finely divided solids containing combustible material including volatile components such that the volatile material is stripped therefrom, passing a gaseous suspension of finely divided solids as a relatively lean phase from the stripping zone to a cooling zone wherein the temperature of the solids is reduced, passing the cooled gaseous suspension of solids as a relatively lean phase to a separating zone wherein the solids are separated from the gaseous material, passing a portion of the cooled separated solids to the primary combustion zone as a dense fluidized mass, and passing another portion of the cooled separated solids to a secondary combustion zone wherein such solids are contacted with an oxygen containing gas to form a dense fluidized mass in order to reduce the combustible content thereof by burning.

References Cited in the file of this patent

UNITED STATES PATENTS

| Number | Name | Date |
|---|---|---|
| 2,394,710 | McAfee | Feb. 10, 1946 |
| 2,396,109 | Martin | Mar. 5, 1946 |
| 2,411,592 | Reeves | Nov. 26, 1946 |
| 2,414,002 | Thomas | Jan. 7, 1947 |
| 2,417,275 | Thompson | Mar. 11, 1947 |
| 2,425,807 | Jahnig | Aug. 19, 1947 |
| 2,425,849 | Voorhees | Aug. 19, 1947 |
| 2,449,622 | Roetheli | Sept. 21, 1948 |
| 2,451,619 | Hengstebeck | Oct. 19, 1948 |
| 2,463,434 | Shankland | Mar. 1, 1949 |
| 2,475,984 | Owen | July 12, 1949 |
| 2,515,373 | Keith | July 18, 1950 |
| 2,518,474 | Hudson | Aug. 15, 1950 |
| 2,518,693 | Jahnig | Aug. 15, 1950 |
| 2,550,741 | Welty | May 1, 1951 |
| 2,558,194 | Orescan | June 26, 1951 |
| 2,562,225 | Wickham et al. | July 31, 1951 |
| 2,638,684 | Jukkola | May 19, 1953 |